United States Patent
Posch et al.

(10) Patent No.: US 8,283,418 B2
(45) Date of Patent: Oct. 9, 2012

(54) POLYPROPYLENE COMPOSITION WITH LOW SURFACE ENERGY

(75) Inventors: Werner Posch, Enns (AT); Manfred Stadlbauer, Linz (AT); Stefan Schiesser, Leonding (AT)

(73) Assignee: Borealis Technology Oy, Porvoo (FI)

( * ) Notice: Subject to any disclaimer, the term of this patent is extended or adjusted under 35 U.S.C. 154(b) by 466 days.

(21) Appl. No.: 12/449,086

(22) PCT Filed: Jan. 18, 2008

(86) PCT No.: PCT/EP2008/050580
§ 371 (c)(1),
(2), (4) Date: Jul. 22, 2009

(87) PCT Pub. No.: WO2008/090096
PCT Pub. Date: Jul. 31, 2008

(65) Prior Publication Data
US 2009/0318621 A1  Dec. 24, 2009

(30) Foreign Application Priority Data
Jan. 22, 2007  (EP) ..................... 07001312

(51) Int. Cl.
C08L 23/04 (2006.01)
C08F 8/00 (2006.01)
C08J 3/00 (2006.01)
(52) U.S. Cl. ........ 525/240; 525/191; 525/197; 134/22.1
(58) Field of Classification Search .......... 525/240, 525/191, 197; 134/22.1
See application file for complete search history.

(56) References Cited

U.S. PATENT DOCUMENTS

| | | | | |
|---|---|---|---|---|
| 4,335,225 | A * | 6/1982 | Collette et al. | 525/240 |
| 4,981,938 | A * | 1/1991 | Hanari et al. | 526/351 |
| 5,468,807 | A * | 11/1995 | Tsurutani et al. | 525/240 |
| 6,071,598 | A * | 6/2000 | Peiffer et al. | 428/213 |
| 6,100,351 | A * | 8/2000 | Sun et al. | 526/125.3 |
| 6,251,997 | B1 * | 6/2001 | Imai et al. | 525/191 |
| 6,322,883 | B1 * | 11/2001 | Williams | 428/308.4 |
| 2004/0158000 | A1 * | 8/2004 | Yada et al. | 525/240 |
| 2005/0136224 | A1 | 6/2005 | Nickel et al. | |
| 2006/0293471 | A1 * | 12/2006 | Minami et al. | 526/127 |

FOREIGN PATENT DOCUMENTS

| | | |
|---|---|---|
| EP | 0 115 940 | 8/1984 |
| EP | 0 129 368 | 12/1984 |
| EP | 0 260 130 | 3/1988 |
| EP | 0 277 514 | 8/1988 |
| EP | 0 423 101 | 4/1991 |
| EP | 0 537 130 | 4/1993 |
| EP | 747212 | * 11/1996 |
| EP | 0 747 212 | 12/1996 |
| EP | 0 801 104 | 10/1997 |
| EP | 0 887 379 | 12/1998 |
| EP | 1 241 206 | 9/2002 |
| EP | 1 236 770 | 9/2004 |
| EP | 1 847 555 | 10/2007 |
| GB | 2 244 283 | 11/1991 |
| WO | WO 92/12182 | 7/1992 |
| WO | WO 95/35323 | 12/1995 |
| WO | WO 97/28170 | 8/1997 |
| WO | WO 98/46616 | 10/1998 |
| WO | WO 98/49208 | 11/1998 |
| WO | WO 98/56831 | 12/1998 |
| WO | WO 99/12981 | 3/1999 |
| WO | WO 99/19335 | 4/1999 |
| WO | WO 00/34341 | 6/2000 |
| WO | WO 03/051934 | 6/2003 |

OTHER PUBLICATIONS

Burfield & Loi; "The Use of Infared Spectroscopy for Determination of Polypropylene Steroregularity"; Article from Journal of Applied Polymer Science, 1988, vol. 36, pp. 279-293; John Wiley & Sons, Inc.; Malaysia.

Hayashi, Inoue & Chujo; "Heptad Configurational Analysis of 13C n.m.r. Spectra in Highly Isotactic in Highly Isostactic Polypropylene"; Article from Polymer; Jan. 1988, vol. 29, pp. 138-143; Tokyo, Japan.

Chujo & Kogure; "Two-Site Model Analysis of 13C n.m.r. of Polypropylene polymerized by Ziegler-Natta Catalyst With External Alkoxysilane Donors"; Article from Polymer, vol. 35, p. 339, 1994; Japan.

* cited by examiner

*Primary Examiner* — Vasu Jagannathan
*Assistant Examiner* — Irina Krylova
(74) *Attorney, Agent, or Firm* — Warn Partners, P.C.

(57) ABSTRACT

Polypropylene composition comprising a) an isotactic polypropylene (iPP) produced in the presence of a single-site catalyst and said isotactic polypropylene (iPP) has a mean isotactic block length between two structural chain defects, as a statistical average, greater than 70, and b) an atactic polypropylene (aPP) with an absorbance ratio of the absorption band at 998 $cm^{-1}$ to the absorption band at 973 $cm^{-1}$ [$A_{998}/A_{973}$] below 0.80 wherein the weight ratio of said atactic polypropylene to the sum of said atactic polypropylene and said isotactic polypropylene (aPP/(aPP+iPP)) is at least 0.50 wt.-%.

10 Claims, 1 Drawing Sheet

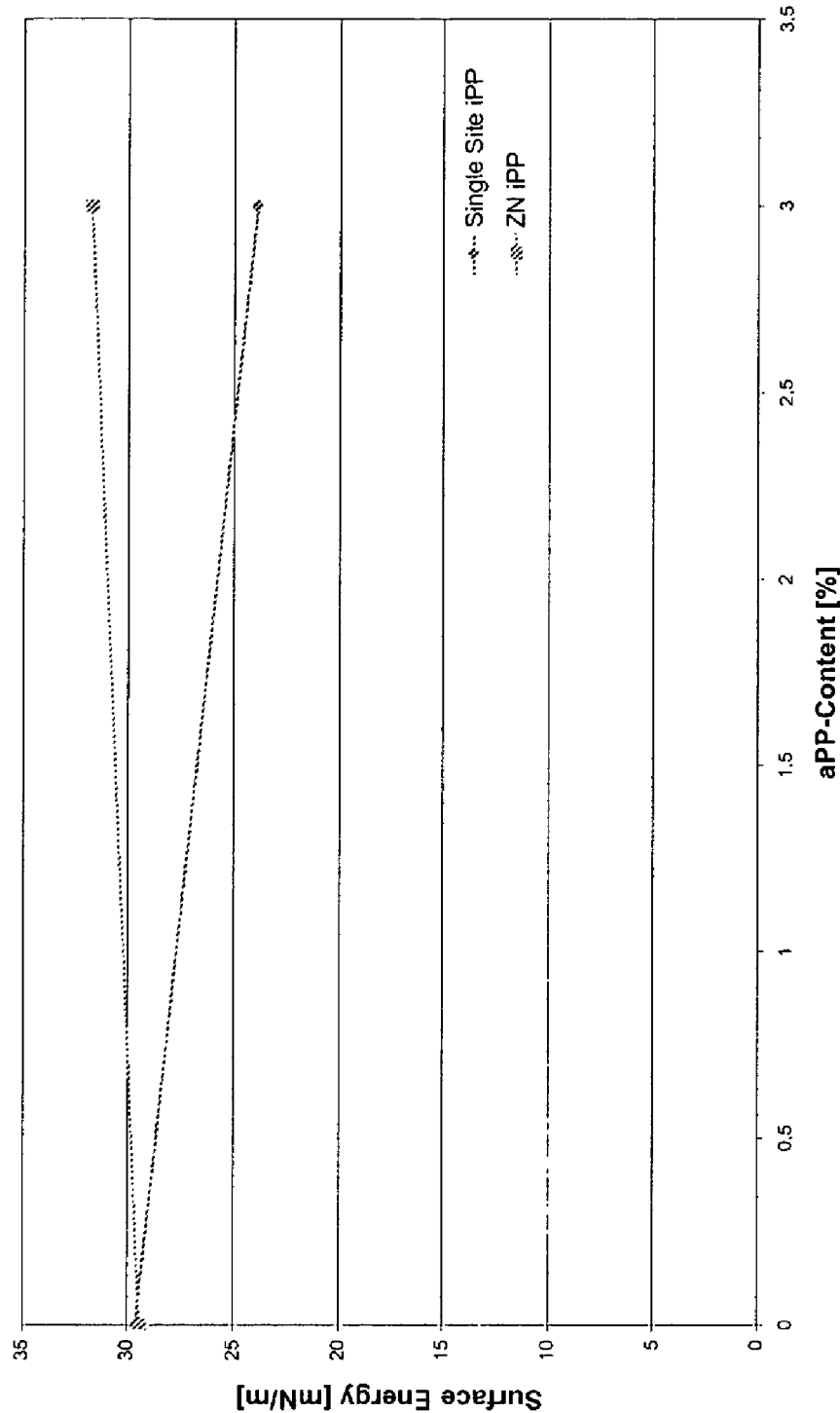
Influence of atactic polypropylene (aPP) on the surface energy of Single Site isotactic polypropylene (single site iPP) and Ziegler-Natta polypropylene (ZN iPP)

… (1)

POLYPROPYLENE COMPOSITION WITH LOW SURFACE ENERGY

This application is a National Stage of International Application No. PCT/EP2008/050580, filed Jan. 18, 2008. This application claims priority to European Patent Application No. 07001312.3 filed on Jan. 22, 2007. The disclosures of the above applications are incorporated herein by reference.

The present invention relates to a new polypropylene composition comprising isotactic polypropylene, its use as well as its manufacture and articles thereof.

The surface energy of plastics is decisive for many end applications. Depending on the application area the plastics must be manipulated to achieve the desired properties. Sometimes the plastics shall be characterized by a rather low surface energy and sometimes the exact opposite, i.e. a rather high surface energy, is appreciated.

One example for the need of an increased surface energy is the printability of polypropylene. For a good printability it is necessary that the ink adheres to the surface of a substrate, for example of a polypropylene. For a proper bond to exist between the ink and the substrate, its surface energy must exceed the ink's surface tension. Thus, the higher the surface energy of the polypropylene in relation to the surface tension of the ink, the better is the printability of the polypropylene.

A similar approach is taken for the conception of dishwashers and washing machines. Decisive for such apparatus are an energy-saving concept for drying the dishes and the laundry, respectively.

Designers and manufacturers for examples of dishwasher systems have used several methods to improve dish drying, cutlery drying and drying of the internal walls of a dishwasher chamber.

One approach is to raise the surface energy of polymeric interior surfaces. The most commonly used methods thereby are plasma- and corona-treatment making the surfaces more polar, i.e. hydrophilic. A hydrophilic surface is more attractive to the water molecules inside the dishwasher, relative to the force of attraction from adjacent water molecules. This water attractive nature of the surfaces promotes the drying performance of the dishwasher. However plasma- and corona-treatment are extra production processes, resulting in extra-costs.

Another known method is to design dishwasher systems with compartments for adding rinse agents to the final fill of washing water. The rinse agent is formulated with surfacting chemistry that alters the water-to-surface interaction. The result is that this conditioned water more effectively "wets" the surfaces of dishes and interior surfaces, forms thinner films and droplets that promote drying, and also drains better from the surfaces.

While these two approaches may have been utilized to promote drying, inherent problems exist with both of these methods. An apparent problem with the second method is the need to use a rinse agent and the extra effort involved with same. Many dishwasher customers simply do not use rinse agents due to, for example, cost or reported allergic reactions. With respect to the first method, as already stated above, it must be considered that an extra production step is necessary, which raises the production costs significantly.

Therefore, one object of the present invention is to enhance the drying performance of a dishwasher and/or washing machines thereby avoiding the drawbacks of the solutions known in the art.

The first finding of the present invention is that new materials must be developed which reduces further the surface energy of known plastics. Such materials decrease the adhesion to water and thus improve the drain of the water from the apparatus.

Thus a further object of the present invention is to seek for materials improving the draining effect of known plastics. Furthermore it is aimed to find an easily applicable solution that would not interfere with the high mechanical and chemical requirement set for a plastic part in the corrosive environment of washing machines and dishwashers. Moreover it would be appreciated that the new material can be recycled and does not have inferior processing properties compared to known plastics in this technical field.

Accordingly, the second finding of the present invention is to add to an isotactic polypropylene, preferably a polypropylene produced in the presence of single-site catalyst, a certain amount of atactic polypropylene.

Accordingly in a first aspect the present invention provides a polypropylene composition comprising
 a) an isotactic polypropylene (iPP) having a mean isotactic block length between two structural chain defects, as a statistical average, greater than 70, and
 b) an atactic polypropylene (aPP) with an absorbance ratio of the absorption band at 998 cm$^{-1}$ to the absorption band at 973 cm$^{-1}$ [$A_{998}/A_{973}$] below 0.80
wherein the weight ratio of said atactic polypropylene to the sum of said atactic polypropylene and said isotactic polypropylene (aPP/(aPP+iPP)) is at least 0.50 wt.-%.

Preferably the isotactic polypropylene (iPP) has been produced in the presence of a single-site catalyst, in particular in the presence of a single-site catalyst as defined in the instant invention in further detail.

Moreover it is preferred that the isotactic polypropylene and/or the atactic polypropylene is (are) a homopolymer as defined below.

Surprisingly, it has been found that a polypropylene composition with such features has superior properties compared to known polypropylenes in this technical field. The polypropylene composition is in particular characterized in that it has a lower surface energy compared to a pure isotactic polypropylene. Even more surprising this effect can be only achieved with the isotactic polypropylene as defined above. In case an isotactic polypropylene with different properties is employed the effect is inverted, i.e. the surface energy is increased (compare FIG. 1). Thus this effect achieved cannot be obtained with polypropylenes commonly used in this technical field, i.e. with polypropylenes produced in the presence of Ziegler-Natta catalysts. Moreover the polypropylene composition of the instant invention has not only a low surface energy but keeps the other properties needed in this technical field on high level, a fact which can be deducted from table 1. Thus this new approach reduces the surface energy, leading to the formation of spherical water-drops which will drain more easily, leaving less water on plastic-surfaces to be dried. In addition the use of atactic polypropylene has little effect on the mechanical behaviour of the polymer which creates the possibility to be used for many applications.

The first requirement of the inventive polypropylene composition is the specific choice of isotactic polypropylene. In the present invention the isotactic polypropylene is that fraction of the polypropylene composition from which the cold xylene soluble fraction is removed and which is soluble in hot xylene. The exact procedure to extract the cold soluble fraction and to collect the hot soluble fraction is discussed in the example section. Said isotactic polypropylene is characterized by a rather long isotactic block length "$n_{iso}$" between two structural chain defects. The procedure to determine the isotactic block length "$n_{iso}$" is defined in EP 0 747 212 A1 and is also given in the example section. Accordingly the isotactic polypropylene has a mean isotactic block length "$n_{iso}$" between two structural chain defects of at least 70, preferably of at least 75, still more preferably of at least 80, yet more preferably of at least 85 and most preferably of at least 90.

It is preferred that the isotactic polypropylene is produced in the presence of a single-site catalyst. A single site catalyst according to this invention is preferably a catalyst comprising a metal coordinated by one or more η-bonding ligands. Such η-bonded metals are typically Zr, Hf or Ti, especially Zr. The η-bonding ligand is typically an $\eta^5$-cyclic ligand, i.e. a homo or heterocyclic cyclopentadienyl group optionally with fused or pendant substituents. Such single site catalysts, preferably metallocene catalysts, have been widely described in the scientific and patent literature for about twenty years. All types are equally suitable as long as the isotactic polypropylene fulfils the requirement of the mean isotactic block length as defined above. Preferred single-site catalysts are defined in more detail below.

A further requirement of the invention is that an atactic polypropylene is present in the polypropylene composition. The atactic polypropylene is that fraction of the polypropylene composition which is soluble in cold xylene. The exact procedure to extract the atactic polypropylene from the polypropylene composition is defined in the example section. Said atactic polypropylene must have a rather low absorbance ratio of the absorption band at 998 cm$^{-1}$ to the absorption band at 973 cm$^{-1}$ [$A_{998}/A_{973}$]. The absorbance ratio reveals the regularity of the polypropylene stereo-structure. A rather low absorbance ratio indicates that the material has a rather low stereo-regularity, i.e. that the material is atactic. The method is a very established method and inter alia described by D. Burfield and P. Loi (J. Appl. Polym. Sci. 1988, 36, 279) and by Chisso Corp. (EP 0 277 514 A2). The exact method applied in the instant invention is defined in the example section. The atactic polypropylene according to the present invention has an absorbance ratio of the absorption band at 998 cm$^{-1}$ to the absorption band at 973 cm$^{-1}$ [$A_{998}/A_{973}$] below 0.80, preferably below 0.70, more preferably below 0.60 and yet more preferably below 0.55.

Furthermore it must be considered that the surface energy of the present composition is dependent on the one hand of the choice of a specific isotactic polypropylene and on the other hand of a minimum amount of atactic polypropylene. Thus in the instant invention the weight ratio of the atactic polypropylene to the sum of the atactic polypropylene and the isotactic polypropylene (aPP/(aPP+iPP)) must be at least 0.50 wt.-%, preferably at least 1.00 wt.-%, more preferably at least 1.50 wt.-%, still more preferably at least 2.00 wt.-%, and yet more preferably at least 2.50 wt.-%. In another preferred embodiment the weight ratio of the atactic polypropylene to the sum of the atactic polypropylene and the isotactic polypropylene (aPP/(aPP+iPP)) must be at least 3.00 wt.-%. However the weight ratio of the atactic polypropylene to the sum of the atactic polypropylene and the isotactic polypropylene (aPP/(aPP+iPP)) shall preferably not exceed a specific value, otherwise the other properties of the polymer composition to be considered in the technical field of household appliances are negatively influenced. Thus it is preferred that the weight ratio does not exceed 10.00 wt.-%. A preferred range for the weight ratio is 0.50 to 9.00 wt.-%, more preferably 1.00 to 7.00 wt-%.

In a second aspect the present invention provides a polypropylene composition comprising
  a) an isotactic polypropylene (iPP) produced in the presence of a single-site catalyst and said isotactic polypropylene has an absorbance ratio of the absorption band at 998 cm$^{-1}$ to the absorption band at 973 cm$^{-1}$ [$A_{998}/A_{973}$] of at least 0.85, and
  b) an atactic (aPP) polypropylene with an absorbance ratio of the absorption band at 998 cm$^{-1}$ to the absorption band at 973 cm$^{-1}$ [$A_{998}/A_{973}$] below 0.80
wherein the weight ratio of said atactic polypropylene to the sum of said atactic polypropylene and said isotactic polypropylene (aPP/(aPP+iPP)) is at least 0.50 wt.-%.

Preferably the isotactic polypropylene and/or the atactic polypropylene is (are) a homopolymer as defined below.

Surprisingly, it has been found that a polypropylene composition with such features has superior properties compared to known polypropylenes in this technical field. The polypropylene composition is in particular characterized in that it has a lower surface energy compared to a pure isotactic polypropylene. Even more surprising this effect can be only achieved with the isotactic polypropylene as defined above. In case an isotactic polypropylene with different properties is employed the effect is inverted, i.e. the surface energy is increased (compare FIG. 1). Thus this effect achieved cannot be obtained with polypropylenes commonly used in this technical field, i.e. with polypropylenes produced in the presence of Ziegler-Natta catalysts. Moreover the polypropylene composition of the instant invention has not only a low surface energy but keeps the other properties needed in this technical field on high level, a fact which can be deducted from table 1. Thus this new approach reduces the surface energy, leading to the formation of spherical water-drops which will drain more easily, leaving less water on plastic-surfaces to be dried. In addition the use of atactic polypropylene has little effect on the mechanical behaviour of the polymer which creates the possibility to be used for many applications.

The first requirement of the inventive polypropylene composition is the specific choice of isotactic polypropylene. In the present invention the isotactic polypropylene is that fraction of the polypropylene composition from which the cold xylene soluble fraction is removed and which is soluble in hot xylene. The exact procedure to extract the cold soluble fraction and to collect the hot soluble fraction is discussed in the example section. Said isotactic polypropylene is produced in the presence of a single-site catalyst. A single site catalyst according to this invention is preferably a catalyst comprising a metal coordinated by one or more η-bonding ligands. Such η-bonded metals are typically Zr, Hf or Ti, especially Zr. The η-bonding ligand is typically an $\eta^5$-cyclic ligand, i.e. a homo or heterocyclic cyclopentadienyl group optionally with fused or pendant substituents. Such single site catalysts, preferably metallocene catalysts, have been widely described in the scientific and patent literature for about twenty years. All types are equally suitable as long as the isotactic polypropylene fulfils the requirement of the absorbance ratio as defined above and in further detail below. Preferred single-site catalysts are further defined below.

Furthermore it is required that said isotactic polypropylene has a rather high absorbance ratio of the absorption band at 998 cm$^{-1}$ to the absorption band at 973 cm$^{-1}$ [$A_{998}/A_{973}$]. The absorbance ratio reveals the regularity of the polypropylene stereo-structure. A rather high absorbance ratio indicates that the material has a rather high stereo-regularity, i.e. that the material is isotactic. The method is a very established method and inter alia described by D. Burfield and P. Loi (J. Appl. Polym. Sci. 1988, 36, 279) and by Chisso Corp. (EP 0 277 514 A2). The exact method applied in the instant invention is defined in the example section. The isotactic polypropylene according to the present invention has an absorbance ratio of the absorption band at 998 cm$^{-1}$ to the absorption band at 973 cm$^{-1}$ [A$_{998}$/A$_{973}$] of at least 0.85, preferably of at least 0.90, more preferably of at least 0.91.

Preferably said isotactic polypropylene is further characterized by a rather long isotactic block length "n$_{iso}$" between two structural chain defects. The procedure to determine the isotactic block length "n$_{iso}$" is defined in EP 0 747 212 A1 and is also given in the example section. Accordingly the isotactic polypropylene has preferably a mean isotactic block length "n$_{iso}$" between two structural chain defects of at least 70, more preferably of at least 75, still more preferably of at least 80, yet more preferably of at least 85 and most preferably of at least 90.

A further requirement of the invention is that an atactic polypropylene is present in the polypropylene composition. The atactic polypropylene is that fraction of the polypropylene composition which is soluble in cold xylene. The exact procedure to extract the atactic polypropylene from the polypropylene composition is defined in the example section. Said atactic polypropylene must have a rather low absorbance ratio of the absorption band at 998 cm$^{-1}$ to the absorption band at 973 cm$^{-1}$ [A$_{998}$/A$_{973}$]. As stated above, the absorbance ratio reveals the regularity of the polypropylene stereostructure. A rather low absorbance ratio indicates that the material has a rather low stereo-regularity, i.e. that the material is atactic. Thus the atactic polypropylene according to the present invention has an absorbance ratio of the absorption band at 998 cm$^{-1}$ to the absorption band at 973 cm$^{-1}$ [A$_{998}$/A$_{973}$] below 0.80, preferably below 0.70, more preferably below 0.60 and yet more preferably below 0.55.

Furthermore it must be considered that the surface energy of the present composition is dependent on the one hand of the choice of a specific isotactic polypropylene and on the other hand of a minimum amount of atactic polypropylene. Thus in the instant invention the weight ratio of the atactic polypropylene to the sum of the atactic polypropylene and the isotactic polypropylene (aPP/(aPP+iPP)) must be at least 0.50 wt.-%, preferably at least 1.00 wt.-%, more preferably at least 1.50 wt.-%, still more preferably at least 2.00 wt.-%, and yet more preferably at least 2.50 wt.-%. In another preferred embodiment the weight ratio of the atactic polypropylene to the sum of the atactic polypropylene and the isotactic polypropylene (aPP/(aPP+iPP)) must be at least 3.00 wt.-%. However the weight ratio of the atactic polypropylene to the sum of the atactic polypropylene and the isotactic polypropylene (aPP/(aPP+iPP)) shall preferably not exceed a specific value, otherwise the other properties of the polymer composition to be considered in the technical field of household appliances are negatively influenced. Thus it is preferred that the weight ratio does not exceed 10.00 wt.-%. A preferred range for the weight ratio is 0.50 to 9.00 wt.-%, more preferably 1.00 to 7.00 wt-%.

The further features mentioned below apply to all embodiments described above, i.e. the first embodiment and the second embodiment defined above.

Preferably the isotactic polypropylene is generally highly isotactic. The chain isotactic index, determined by means of $^{13}$C-NMR as defined in the example section, of the isotactic polypropylene is higher than 91%, more preferably higher than 93%, still more preferably higher than 94% and most preferably higher than 95%.

The molecular weight distribution (MWD) is expressed as the ratio of weight average molecular weight (M$_w$) and number average molecular weight (M$_n$). The number average molecular weight (M$_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight (M$_w$) is the first moment of a plot of the weight of polymer in each molecular weight range against molecular weight.

The number average molecular weight (M$_n$) and the weight average molecular weight (M$_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

It is preferred that the isotactic polypropylene of the polypropylene composition has a weight average molecular weight (M$_w$) from 10,000 to 700,000 g/mol, more preferably from 20,000 to 600,000 g/mol.

The number average molecular weight (M$_n$) of the isotactic polypropylene is preferably in the range of 5,000 to 500,000 g/mol, more preferably from 10,000 to 300,000 g/mol.

In a preferred embodiment the molecular weight distribution (MWD) is relatively low. Thus it is preferred that the isotactic polypropylene has a molecular weight distribution (MWD) of below 4.00 still more preferred below 3.00. Thus a preferred range of the molecular weight distribution (MWD) of the istoatic polypropylene is from 1.50 to 5.00, more preferably from 2.50 to 4.00.

In addition, it is preferred that the isotactic polypropylene of the inventive polypropylene composition has a melting temperature Tm of below 164° C. On the other hand it is also preferred that the melting temperature Tm of the isotactic polypropylene exceeds 150° C.

The isotactic polypropylene of the polypropylene composition according to this invention can be a homopolymer or a copolymer. However it is preferred that the isotactic polypropylene is an isotactic propylene homopolymer.

The expression isotactic propylene homopolymer as used in this invention relates to an isotactic polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be measured with FT infrared spectroscopy. Further details are provided below in the examples.

In case the isotactic polypropylene used for the preparation of the inventive polypropylene composition is an isotactic propylene copolymer, it is preferred that the comonomer is ethylene. However, also other comonomers known in the art, like 1-butene, are suitable. Preferably, the total amount of comonomer, more preferably ethylene, in the isotactic propylene copolymer is up to 10 mol %, more preferably up to 8 mol %, and even more preferably up to 6 mol %.

The atactic polypropylene is preferably further characterized by a rather short isotactic block length "n$_{iso}$" between two structural chain defects. Accordingly the atactic polypropylene has a mean isotactic block length "n$_{iso}$" between two structural chain defects below 20, more preferably below 10. On the other hand it is appreciated that mean isotactic block length "n$_{iso}$" between two structural chain defects exceeds 3. Thus a preferred range of the mean isotactic block length "n$_{iso}$" between two structural chain defects for the atactic polypropylene is 3 to 20, more preferably 3 to 10.

The atactic polypropylene of the polypropylene composition according to this invention can be a homopolymer or a copolymer. However it is preferred that the atactic polypropylene is an atactic propylene homopolymer.

The expression atactic propylene homopolymer as used in this invention relates to an atactic polypropylene that consists substantially, i.e. of at least 97 wt %, preferably of at least 99 wt %, and most preferably of at least 99.8 wt % of propylene units. In a preferred embodiment only propylene units in the atactic polypropylene homopolymer are detectable. The comonomer content can be measured with FT infrared spectroscopy. Further details are provided below in the examples.

In case the atactic polypropylene used for the preparation of the inventive polypropylene composition is an atactic propylene copolymer, it is preferred that the comonomer is ethylene. However, also other comonomers known in the art, like 1-butene, are suitable. Preferably, the total amount of comonomer, more preferably ethylene, in the atactic propylene copolymer is up to 10 mol %, more preferably up to 8 mol %, and even more preferably up to 6 mol %.

Even more preferred the atactic polypropylene is produced in the presence of a Ziegler-Natta catalyst. The use of a Ziegler-Natta catalyst is well known and will be readily carried out by a person skilled in the art. A preferred Ziegler-Natta catalyst used for the manufacture of the atactic polypropylene is defined in more detail below.

Preferably the polypropylene composition has cold xylene solubles of not more than 15.00 wt.-%, still more preferred not more than 10.00 wt.-%. A preferred range of the cold xylene soluble fraction is 0.5 to 10.0, more preferably 0.5 to 5.0.

Furthermore the polypropylene composition is preferably defined by a low surface energy. The measuring method thereto is defined in the example section. Thus it is preferred that the polypropylene composition has a surface energy below 29.00 mN/m, more preferably below 27.00 mN/m, still more preferably below 26.00 mN/m and yet more preferably below 25.00 mN/m.

In the following the process for the manufacture of the instant polypropylene composition will be described.

In a first step both polypropylenes are produced.

For the manufacture of the isotactic polypropylene a single-site catalyst is employed. A single site catalyst according to this invention is preferably a catalyst comprising a metal coordinated by one or more η-bonding ligands. Such η-bonded metals are typically Zr, Hf or Ti, especially Zr or Hf. The η-bonding ligand is typically an $\eta^5$-cyclic ligand, i.e. a homo or heterocyclic cyclopentadienyl group optionally with fused or pendant substituents.

A in particular preferred single-site catalyst may have a formula (I)

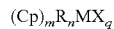  (I)

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR''$_3$, —OSiR''$_3$, —SR'', —PR''$_2$ or —NR''$_2$,
each R'' is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl, or e.g. in case of —NR''$_2$, the two substituents R'' can form a ring, e.g. five- or six-membered ring, together with the nitrogen atom to which they are attached;
R is a bridge of 1 to 7 atoms, e.g. a bridge of 1 to 4 C-atoms and 0 to 4 hetero atoms, wherein the heteroatom(s) can be e.g. Si, Ge and/or O atom(s), wherein each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents, or a bridge of 1 to 3, e.g. one or two, hetero atoms, such as silicon, germanium and/or oxygen atom(s), e.g. —SiR'$_2$—, wherein each R' is independently $C_1$-$C_{20}$-alkyl, $C_6$-$C_{20}$-aryl or tri($C_1$-$C_{20}$-alkyl)silyl-residue, such as trimethylsilyl,
M is a transition metal of Group 3 to 10, preferably of Group 4 to 6, such as Group 4, e.g. Ti, Zr or Hf, especially Zr,
each X is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_2$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR'', —PR''$_3$, —SiR''$_3$, —OSiR''$_3$, —NR''$_2$ or —CH$_2$—Y, wherein Y is $C_6$-$C_{20}$-aryl, $C_6$-$C_{20}$-heteroaryl, $C_1$-$C_{20}$-alkoxy, $C_6$-$C_{20}$-aryloxy, NR''$_2$, —SR'', —PR''$_3$, —SiR''$_3$, or —OSiR''$_3$;
each of the above mentioned ring moieties alone or as a part of another moiety as the substituent for Cp, X, R'' or R' can further be substituted e.g. with $C_1$-$C_{20}$-alkyl which may contain Si and/or O atoms;
n is 0, 1 or 2, e.g. 0 or 1,
m is 1, 2 or 3, e.g. 1 or 2,
q is 1, 2 or 3, e.g. 2 or 3,
wherein m+q is equal to the valency of M.

Suitably, in each X as —CH$_2$—Y, each Y is independently selected from $C_6$-$C_{20}$-aryl, NR''$_2$, —SiR''$_3$ or —OSiR''$_3$. Most preferably, X as —CH$_2$—Y is benzyl. Each X other than —CH$_2$—Y is independently halogen, $C_1$-$C_{20}$-alkyl, $C_1$-$C_{20}$-alkoxy, $C_6$-$C_{20}$-aryl, $C_7$-$C_{20}$-arylalkenyl or —NR''$_2$ as defined above, e.g. —N($C_1$-$C_{20}$-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula I, each Cp independently bears 1, 2, 3 or 4 substituents as defined above, preferably 1, 2 or 3, such as 1 or 2 substituents, which are preferably selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR''$_3$, wherein R'' is as indicated above, preferably $C_1$-$C_{20}$-alkyl.

R, if present, is preferably a methylene, ethylene or a silyl bridge, whereby the silyl can be substituted as defined above, e.g. a (dimethyl)Si═, (methylphenyl)Si═ or (trimethylsilylmethyl)Si═; n is 0 or 1, m is 2 and q is two. Preferably, R'' is other than hydrogen.

A specific subgroup includes the well known metallocenes of Zr, Hf and Ti with two $\eta^5$-ligands which may be bridged or unbridged cyclopentadienyl ligands optionally substituted with eg siloxy, or alkyl (e.g. $C_1$-$C_6$-alkyl) as defined above, or with two unbridged or bridged indenyl ligands optionally substituted in any of the ring moieties with eg siloxy or alkyl as defined above, e.g. at 2-, 3-, 4- and/or 7-positions. Preferred bridges are ethylene or —SiMe$_2$.

The preparation of the single-site catalysts can be carried out according or analogously to the methods known from the literature and is within skills of a person skilled in the field. Thus for the preparation see e.g. EP 0 129 368, examples of compounds wherein the metal atom bears a —NR''$_2$ ligand see inter alia in WO 98/56831 and WO 00/34341. For the preparation see also e.g. in EP 0 260 130, WO 97/28170, WO 98/46616, WO 98/49208, WO 99/12981, WO 99/19335, WO 98/56831, WO 00/34341, EP 0 423 101 and EP 0 537 130.

Alternatively, in a further subgroup of the metallocene compounds, the metal bears a Cp group as defined above and additionally a $\eta^1$ or $\eta^2$ ligand, wherein said ligands may or may not be bridged to each other. Such compounds are described e.g. in WO 9613529, the contents of which are incorporated herein by reference.

The single-site catalysts are generally used as part of a catalyst system which also includes a cocatalyst or catalyst activator, for example, an aluminoxane (e.g. methylaluminoxane (MAO), hexaisobutylaluminoxane and tetraisobutylaluminoxane) or a boron compound (e.g. a fluoroboron compound such as triphenylpentafluoroboron or triphentylcarbenium tetraphenylpentafluoroborate (($C_6H_5$)$_3$ $B^+B^-$($C_6F_5$)$_4$)) The preparation of such catalyst systems is well known in the field.

If desired the single-site catalyst, single-site catalyst/cocatalyst mixture or a single-site catalyst/cocatalyst reaction product may be used in unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO 03/051934 which is incorporated herein as a reference.

The activator is a compound which is capable of activating the transition metal component Useful activators are, among others, aluminium alkyls and aluminium alkoxy compounds. Especially preferred activators are aluminium alkyls, in particular aluminium trialkyls, such as trimethyl aluminium, triethyl aluminium and tri-isobutyl aluminium. The activator is typically used in excess to the transition metal component. For instance, when an aluminium alkyl is used as an activator, the molar ratio of the aluminium in the activator to the transition metal in the transition metal component is from 1 to 500 mol/mol, preferably from 2 to 100 mol/mol and in particular from 5 to 50 mol/mol.

It is also possible to use in combination with the above-mentioned two components different co-activators, modifiers and the like. Thus, two or more alkyl aluminium compounds may be used, or the catalyst components may be combined with different types of ethers, esters, silicon ethers and the like to modify the activity and/or the selectivity of the catalyst, as is known in the art.

Suitable combinations of transition metal component and activator are disclosed among others, in the examples of WO 95/35323.

The polymerisation process for isotactic polypropylene is preferably a Borstar process, known in the art. A preferred multistage process is a "loop-gas phase"-process, such as developed by Borealis A/S, Denmark (known as BORSTAR® technology) described e.g. in patent literature, such as in EP 0 887 379 or in WO 92/12182.

For the manufacture of the atactic polypropylene a Ziegler-Natta catalyst is employed in a slurry process, known in the art. Besides isotactic polypropylene, such process produces atactic polypropylene which is separated in a later process step.

Preferred Ziegler-Natta catalysts comprise a transition metal component and an activator. The transition metal component comprises a metal of Group 4 or 5 of the Periodic System (IUPAC) as an active metal. In addition, it may contain other metals or elements, like elements of Groups 2, 13 and 17.

Preferably, the transition metal component is a solid. More preferably, it has been supported on a support material, such as inorganic oxide carrier or magnesium halide.

After the manufacture of both polypropylenes, i.e. the isotactic polypropylene and the atactic polypropylene, both components are intimately mixed by known methods to obtain a polymer composition in the desired ratio. If necessary any additives can be additionally incorporated.

Moreover the present invention is also directed to the use of the above defined polypropylene composition. Accordingly the polypropylene composition as defined herein is used as a surface in articles, e.g. in apparatus, in particular for articles, e.g. for apparatus, coming in contact with hydrophilic liquids, like water. Preferred articles for which the polypropylene composition is used are household appliances, e.g. refrigerators, dishwashers and washing machines. More preferably the inventive polypropylene composition is used as internal walls of the household appliances, like refrigerators, dishwashers and washing machines.

Additionally the present invention also encompasses articles, e.g. apparatus, comprising the polypropylene composition of the present invention. Preferably the polypropylene composition as defined herein is a surface of the articles, e.g. of the apparatus. More preferably the articles, e.g. the apparatus, comprising the polypropylene composition of the present invention are articles, e.g. apparatus, coming in contact with hydrophilic liquids, like water. Preferred articles comprising the polypropylene composition are household appliances, e.g. refrigerators, dishwashers and washing machines. More preferably the internal walls of the household appliances, like refrigerators, dishwashers and washing machines, comprise the inventive polypropylene composition of the instant invention.

For example a washing machine comprises:
a first washing machine component defined by a tub;
a second washing machine component defined by a door movable between an open position, wherein access to within the tub is permitted, and a closed position, wherein a washing chamber is established by the tub and door, at least one of the first and second washing machine components being formed from a plastic material and having a surface which is exposed to the washing chamber,
wherein the plastic material comprises, preferably is, the polypropylene composition as defined in the instant invention.

A dishwasher may comprise a plurality of dishwasher components, at least one dishwasher component having a surface comprising, preferably being, the polypropylene of the instant invention. More preferably the dishwasher component comprising, preferably being, the polypropylene of the instant invention is selected from the group consisting of a screen vent, silverware basket, a dishwasher tub, and a door lining.

A refrigerator may comprise a plurality of refrigerator components, at least one refrigerator component having a surface comprising, preferably being, the polypropylene of the instant invention. More preferably the refrigerator component comprising, preferably being, the polypropylene of the instant invention is selected from the group consisting of a refrigerator door, a refrigerator box and a refrigerator tub, and an icebox.

With regard to the above described invention the following embodiments are particularly preferred:

Paragraph 1: Polypropylene composition comprising
 a) an isotactic polypropylene (iPP) produced in the presence of a single-site catalyst and said isotactic polypropylene (iPP) has a mean isotactic block length between two structural chain defects, as a statistical average, greater than 70, and
 b) an atactic polypropylene (aPP) with an absorbance ratio of the absorption band at 998 $cm^{-1}$ to the absorption band at 973 $cm^{-1}$ [$A_{998}/A_{973}$] below 0.80 wherein the weight ratio of said atactic polypropylene to the sum of said atactic polypropylene and said isotactic polypropylene (aPP/(aPP+iPP)) is at least 0.50 wt.-%.

Paragraph 2: Polypropylene composition comprising
a) an isotactic polypropylene (iPP) produced in the presence of a single-site catalyst and said isotactic polypropylene has an absorbance ratio of the absorption band at 998 cm$^{-1}$ to the absorption band at 973 cm$^{-1}$ [$A_{998}/A_{973}$] of at least 0.85, and
b) an atactic polypropylene (aPP) with an absorbance ratio of the absorption band at 998 cm$^{-1}$ to the absorption band at 973 cm$^{-1}$ [$A_{998}/A_{973}$] below 0.80
wherein the weight ratio of said atactic polypropylene to the sum of said atactic polypropylene and said isotactic polypropylene (aPP/(aPP+iPP)) is at least 0.50 wt.-%.

Paragraph 3: Polypropylene composition according to paragraph 1, wherein the isotactic polypropylene is produced in the presence of a single-site catalyst.

Paragraph 4: Polypropylene composition according to paragraph 2, wherein the mean isotactic block length of said isotactic polypropylene between two structural chain defects is, as a statistical average, greater than 70.

Paragraph 5: Polypropylene composition according to any one of the preceding paragraphs 1 to 4, wherein the isotactic and/or the atactic polypropylene is a homopolymer.

Paragraph 6: Polypropylene composition according to any one of the preceding paragraphs 1 to 5, wherein the mean isotactic block length of the atactic polypropylene molecule between two structural chain defects is, as a statistical average, below 20.

Paragraph 7: Polypropylene composition according to any one of the preceding paragraphs 1 to 6, wherein the isotactic polypropylene has molecular weight distribution (MWD) of below 4.00.

Paragraph 8: Polypropylene composition according to any one of the preceding paragraphs 1 to 7, wherein the isotactic polypropylene has a melting temperature of below 163° C.

Paragraph 9: Polypropylene composition according to any one of the preceding paragraphs 1 to 8, wherein the atactic polypropylene has been produced in the presence of a Ziegler-Natta catalyst.

Paragraph 10: Polypropylene composition according to any one of the preceding paragraphs 1 to 9, wherein said composition has a xylene cold soluble fraction of below 15.00 wt.-%.

Paragraph 11: Polypropylene composition according to any one of the preceding paragraphs 1 to 10, wherein said composition has a surface energy of below 29.00 mN/m.

Paragraph 12: Use of a polypropylene composition according to any one of the preceding paragraphs 1 to 11 as a surface of articles.

Paragraph 13: Use according to paragraph 12, wherein the article comes in contact with water.

Paragraph 14: Use according to paragraph 12 or 13, wherein the article is a household appliance.

Paragraph 15: Use according to any one of the preceding paragraphs 12 to 14, wherein the article is selected from the group consisting of a refrigerator, a dishwasher and a washing machine.

Paragraph 16: Article comprising a polypropylene composition according to any one of the preceding paragraphs 1 to 11.

Paragraph 17: Article according to paragraph 16, wherein the article comes in contact with water.

Paragraph 18: Article according to paragraph 16 or 17, wherein the article which comes in contact with water is a refrigerator, a dishwasher or a washing machine.

Paragraph 19: Process for obtaining a polypropylene composition according to any one of the preceding paragraphs 1 to 11, wherein the isotactic polypropylene (iPP) is mixed with the atactic polypropylene (aPP) to obtain a weight ratio of said atactic polypropylene to the sum of said atactic polypropylene and said isotactic polypropylene (aPP/(aPP+iPP)) of at least 0.5 wt.-%.

The invention is now further described by way of examples.

EXAMPLES

1. Definitions/Measuring Methods

The following definitions of terms and determination methods apply for the above general description of the invention as well as to the below examples unless otherwise defined.

A. NMR-spectroscopy measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

B. Chain Isotactic Index

To characterize the isotacticity of polymer chains, $^{13}$C-NMR spectroscopic triad isotactic index II (triads) is used. Determination of the Triad-Related Chain Isotactic Index II (Triads)

The chain isotactic index II (triads) of the isotactic polypropylene or the atactic polypropylene is determined from the $^{13}$C-NMR spectrum. The intensities of triad signals which result from the methyl groups with different local environments are compared.

With regard to the evaluation of the $^{13}$C-NMR spectrum, a distinction must be made between two cases:
A) The material investigated is a pure propylene homopolymer without a random $C_2$ content.
B) The material investigated is a propylene polymer having a low $C_2$ content.

Case A

The chain isotactic index of the propylene homopolymer is determined from its $^{13}$C-NMR spectrum. The intensities of the signals which result from the methyl groups with different environments are compared. In the $^{13}$C-NMR spectrum of a propylene homopolymer, essentially three groups of signals, so-called triads, occur:
1. At a chemical shift of about 21 to 22 ppm, the "mm-triad" occurs and is assigned to the methyl groups having methyl groups directly adjacent on the left and right.
2. At a chemical shift of about 20.2 to 21 ppm, the "mr-triad" occurs and is assigned to the methyl groups having methyl groups directly adjacent on the left or right.
3. At a chemical shift of about 19.3 to 20 ppm, the "mr-triad" occurs and is assigned to the methyl groups without directly adjacent methyl groups.

The intensities of the signal groups assigned are determined as the integral of the signals. The chain isotactic index is defined as follows:

$$IITriaden = \frac{J_{mm} + 0.5 J_{mr}}{J_{mm} + J_{mr} + J_{rr}} * 100$$

where $J_{mm}$, $J_{mr}$ and $J_{rr}$ are the integrals of the signal groups assigned.

Case B

The figures below are a schematically enlarged representation of a $^{13}$C-NMR spectrum of an ethylene/propylene copolymer. The chemical shift of the methyl groups of interest is in the range from 19 to 22 ppm. As can be seen from the figures below, the spectrum of the methyl groups can be divided into three blocks. In these blocks, the CH$_3$ groups appear in triad sequences, whose assignment to the local environments is explained in detail below:

Block 1:
CH$_3$ groups in the PPP sequence (mm-triad)

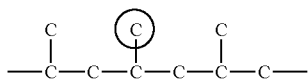

Block 2:
CH$_3$ groups in the PPP sequence (mr- or rm-triads)

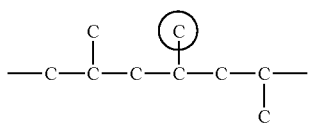

and CH$_3$ groups in the EPP sequence (m-chain):

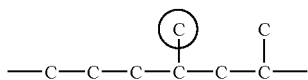

Block 3:
CH$_3$ groups in the PPP sequence (rr-triads):

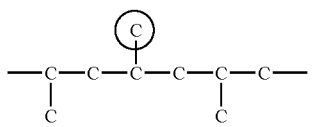

CH$_3$ groups in an EPP sequence (r-chain):

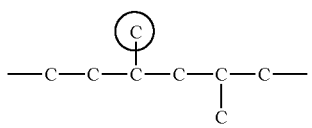

CH$_3$ groups in an EPE sequence:

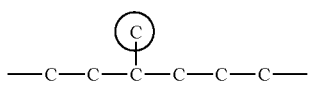

In the determination of the triad-related chain isotactic index II (triads) of the ethylene/propylene copolymer, only PPP triads were considered, i.e. only those propylene units which are present between two adjacent propylene units (cf. also EP 0 115 940 B1, page 3, lines 48 and 49).

The definition of the triad isotactic index of an ethylene/propylene copolymer is:

$$II(\text{triads}) = 100 \cdot (J_{mm}/J_{PPP})$$

Calculation of the chain isotactic index of an ethylene/propylene copolymer:
1. $J_{mm}$ is given by the peak integral of block 1.
2. Calculate the integral ($J_{total}$) of all methyl group peaks in blocks 1, 2 and 3.
3. By simple considerations, it is possible to show that $$J_{PPP} = J_{total} - J_{EPP} - J_{EPE}$$

Sample Preparation and Measurement 60 to 100 mg of polypropylene are weighed into a 10 mm NMR tube, and hexachlorobutadiene and tetrachloroethane in a ratio of about 1.5:1 are added until a fill height of about 45 mm is reached. The suspension is stored at about 140° C. until (as a rule about one hour) a homogeneous solution has formed. In order to accelerate the dissolution process, the sample is stirred from time to time with a glass rod.

The $^{13}$C-NMR spectrum is recorded at an elevated temperature (as a rule 365 K) under standard measuring conditions (semiquantitatively).

Mean Isotactic Block Length $n_{iso}$

The mean isotactic block length $n_{iso}$ is determined from the $^{13}$C-NMR spectrum according to the formula $$n_{iso} = 1 + 2J_{mm}/J_{mr}$$

C. Differential Scanning Calorimetry (DSC)

Melting temperature Tm, crystallization temperature Tc, and the degree of crystallinity are measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3. In case more than one melting peak is observed, the melting temperature Tm (as used to interpret the SIST data) is the maximum of the peak at the highest melting temperature with an area under the curve (melting enthalpy) of at least 5% of the total melting enthalpy of the crystalline fraction of the polypropylene.

D. Comonomer Content

The comonomer content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of —CH$_2$— absorption peak (710-750 cm$^{-1}$) and of the buteen absorption peak (750-780 cm$^{-1}$) was measured with Perkin Elmer FTIR 1600 spectrometer. The method was calibrated by ethylene content and 1-butene content data measured by $^{13}$C-NMR.

E. Tensile Properties

Tensile Properties (TENSILE MODULUS (MD), TENSILE STRESS AT YIELD (MD), TENSILE STRAIN AT YIELD (MD), WORK AT YIELD (MD), TENSILE STRENGTH (MD), TENSILE STRAIN AT STRENGTH (MD), WORK AT STRENGTH (MD), TENSILE STRESS AT BREAK (MD), TENSILE STRAIN AT BREAK (MD), WORK AT BREAK (MD)): these are determined according to ISO527-3 (cross head speed: 1 mm/min).

F. Haze and Transparency

Haze and transparency are determined: ASTM D1003-92.

G. Cold Xylene Solubles (XS, wt.-%)

2 g of polymer is added to 200 ml xylene in a reflux vessel with N$_2$ purge.

The mixture is heated up to 135° C. in 35 minutes and stirred for 30 minutes (meanwhile the polymer is dissolved in boiling xylene).

Then the sample is cooled to 50° C. in 30 minutes and when reaching 50° C. the solution is placed in a water-bath at 25° C. and keeping it in the water-bath for exact 140 minutes without stirring.

Then the mixture is stirred for exact 10 minutes.

The mixture is filtered. The precipitate is dried in a vacuum-oven at 70° C. during 30 minutes.

$$XS\ \% = (100 \times m_1 \times v_0)/(m_0 \times v_1), \text{ wherein}$$

$m_0$=initial polymer amount (g)
$m_1$=weight of residue (g)
$v_0$=initial volume (ml)
$V_1$=volume of analyzed sample (ml)

H. Hot Xylene Insolubles (wt %)
1. Hot Xylene Insolubles

Circa 2 g of the polymer ($m_p$) are weighted and put in a mesh of metal which is weighted ($m_{p+m}$). The polymer in the mesh is extracted in a soxhlet apparatus with boiling xylene for two days. Subsequently, the mesh is dried and weighted again ($m_{XHU+m}$). The mass of the xylene hot insolubles $m_m - m_{XHU+m} = m_{XHU}$ is put in relation to the weight of the polymer to obtain the fraction of xylene insolubles $m_{XHU}/m_p$.

2. Hot Xylene Solubles

From the polypropylene composition and from the film made thereof, respectively, the cold soluble fraction, i.e. the atactic polypropylene, is removed as described in point G. Subsequently the insoluble fraction is taken and extracted as described above (H.1.). The part which is soluble represents the hot soluble fraction, i.e. the isotactic polypropylene.

I. Polymer Surface Energy

The surface energy of the polymer is measured according to the Zisman contact angle method. Drops of a number of liquids of known surface tension are put onto the polymer surface. For each drop the contact angle θ to the polymer surface is measured. A graph of cos θ as a function of liquid surface tension is produced. The data are fitted by linear regression and the surface tension at cos θ=1 (i.e. the so-called "critical surface tension" in the Zisman plot) is defined as the surface energy of the polymer.

J. Isotacticity Index in Polypropylene by FTIR/Absorption Ratio

FTIR spectrum is obtained from a pressed polypropylene film which is tempered in a vacuum oven for 1 hour and rested at room temperature for 16 to 20 h. Isotacticity index (absorption ratio) is an indirect method for determination of isotacticity in polypropylene based on works of D. Burfield and P. Loi (J. Appl. Polym. Sci. 1988, 36, 279) and CHISSO Corp. (EP 0 277 514 B1). It is the ratio of isotactic absorption band at 998 cm$^{-1}$ to reference band at 973 cm$^{-1}$. It can be expressed by the equation:

$$I.I. = A_{998}/A_{973}$$

$A_{998}$ corresponds to 11-12 repeat units in crystalline regions
$A_{973}$ corresponds to 5 units in amorphous and crystalline chains The isotacticity index (absorption ratio) is not direct comparable to isotacticity by NMR due to:

IR method is based on the number of crystallising isotactic helices (intermolecular) and refers to at least 10 or more isotactic units in the chain, while in NMR the observed resonances reveal directly to the stereostructure of the polymer chain (incl. syndio/atactic structures; intramolecular) and refers to a chain isotacticity expressed by 5 repeated isotactic units. In order to relate the IR measurements to the content of long isotactic chain, it is necessary that the isotactic chain in the sample take a helix structure as much as possible and hence it is important to make the crystallisation conditions at the time of sample preparation definite and sufficiently carry out annealing.

Sampling Procedure
Samples:

Originally the samples to be analyzed can be in many different forms (e.g. reactor powder, pellets, film, string from melt indexer, plate, piece of pipe). Inhomogeneous samples should be homogenized before analyses (e.g. inhomogeneous powder mixed well, pelletized with lab extruder or run through a melt indexer). For an exact measurement of highly filled samples an additional hot filtration step is necessary to remove the fillers from the polymer matrix. In this case the preferred solvent is xylene.

Sample Preparation:

Films of a thickness of about 80 to 120 μm are pressed following the operation instructions of the press. The hot press temperature is about 190 to 200° C., pressing time is at least 1 min at 200 bar. Cooling the sample to room temperature can be done fast in one step or with a temperature program stepwise (Specac conditions) at 200 bars. The amount of sample needed depends on the press, but at least 1 gram should be available for each film. The films pressed should be smooth and free of voids or air bubbles. 1-2 films are pressed of the samples. Due to the fact described above this procedure is followed by putting the films into a round-bottom flask, closed and evacuate the flask and stored the flask for 1 hour at 135° C. in a drying oven. Alternatively this procedure can be done direct in a vacuum drying oven. After that the films are annealed at room temperature for at least 18 hours +/−2 hours.

Analysis:

Background, i.e. the spectrum of the nitrogen atmosphere, is collected. The spectra of the calibration standards and the samples are collected. Alternatively a sample shutter can be used. All the spectra are obtained using the following system parameters:

| | |
|---|---|
| Resolution: | 2 cm$^{-1}$ |
| wave number area: | 4000-400 cm$^{-1}$ |
| number of scans: | depending on the FTIR instrument, e.g. shuttle performance 4-8-4 |

Determination of two films of each sample is recommended. If the spectra of the two films made from the same polymer differ more the 5% from each other, new films should be pressed and new spectra obtained.

Calculation

The wave number range of 1100-810 cm$^{-1}$ is selected. The baseline is drawn approximately through the minimum points between 1080-920 cm$^{-1}$. The heights of peaks at 998 and 973 cm$^{-1}$ are measured corrected with baseline. These correspond to the absorbances. Isotacticity index (absorption ratio) is calculated according to the following equation:

$$I.I. = A_{998}/A_{973}$$

$A_{998}$ peak height (corresponds to 11-12 repeat units in crystalline regions)
$A_{973}$ peak height (corresponds to 5 units in amorph. and crystall. chains; reference peak)

K. MWD, $M_n$, $M_w$

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

2. Examples

Example 1

Comparative 1

A commercial Ziegler-Natta polypropylene, Borealis HD120MO (MFR 8 and I.I of 0.97) has been used.

From the pellets, a cast film has been prepared using a PM30 cast-film line with a flat die attached, at a melt temperature of ca. 240° C. and a die gap of ca. 150 µm to obtain a cast film of 100±3 µm thickness.

Example 2

Comparative 2

1940 g of the commercial Ziegler-Natta polypropylene of example 1, Borealis HD120MO (MFR 8 and I.I of 0.97) has been compounded with 60 g of an atactic polypropylene (I.I. of <0.10), obtained as a side-product from a slurry polymerization with a Ziegler-Natta catalyst: The atactic polypropylene has been cooled with liquid nitrogen, grinded, added to the isotactic polypropylene and mixed. Such prepared blend has been compounded with a twin screw extruder PRISM 24, using standard process settings (melt temperature 220±10° C. and 250 rpm screw rotary speed), and pelletized with a strand pelletizing unit.

From such prepared pellets, a cast film has been prepared using a PM30 cast-film line with a flat die attached, at a melt temperature of ca. 240±10° C. and a die gap of ca. 150 µm to obtain a cast film of 100±3 µm thickness.

Example 3

Comparative 3

A catalyst was prepared as described in example 5 of WO 03/051934, with the Al- and Zr-ratios as given in said example (Al/Zr=250) and it has been employed in a Borstar process as described in patent literature, such as in EP 0 887 379 or in WO 92/12182.

From obtained pellets (I.I of 0.98) a cast film has been prepared using a PM30 cast-film line with a flat die attached, at a melt temperature of ca. 240° C. and a die gap of ca. 150 µm to obtain a cast film of 100±3 µm thickness.

Example 4

Inventive 1

1940 g of the isotactic polypropylene of example 3 have been compounded with 60 g of an atactic polypropylene (I.I. of <0.10), obtained as a side-product from a slurry polymerization with a Ziegler-Natta catalyst. The atactic polypropylene has been cooled with liquid nitrogen, grinded, added to the isotactic polypropylene and mixed. Such prepared blend has been compounded with a twin screw extruder PRISM 24, using standard process settings (melt temperature 220±10° C. and 250 rpm screw rotary speed), and pelletized with a strand pelletizing unit.

From such prepared pellets, a cast film has been prepared using a PM30 cast-film line with a flat die attached, at a melt temperature of ca. 240±10° C. and a die gap of ca. 150 µm to obtain a cast film of 100±3 µm thickness.

TABLE 1

Properties of the Examples

| | | Example 1 | Example 2 | Example 3 | Example 4 |
|---|---|---|---|---|---|
| Film Surface Energy (critical) | mN/m | 29.38 | 31.74 | 29.57 | 23.88 |
| G' AT 23° C. | MPa | 928 | 905 | 938 | 804 |
| SEALING INITIATION TEMPERATURE | ° C. | 140 | 138 | 132 | 138 |
| SEALING END TEMPERATURE | ° C. | 144 | 144 | 144 | 146 |
| TENSILE MODULUS (MD) | MPa | 856.16 | 867.87 | 848.69 | 761.32 |
| TENSILE STRENGTH (MD) | MPa | 49.1 | 47.58 | 48.15 | 46.94 |
| TENSILE STRAIN AT STRENGTH (MD) | % | 713.79 | 714.04 | 688.61 | 724.57 |
| TENSILE STRESS AT YIELD (MD) | MPa | 21.94 | 21.48 | 21.62 | 20.08 |
| TENSILE STRAIN AT YIELD (MD) | % | 5.57 | 5.69 | 5.2 | 8.11 |
| WORK AT YIELD (MD) | J | 0.137 | 0.143 | 0.136 | 0.204 |
| WORK AT STRENGTH (MD) | J | 22.812 | 23.909 | 25.331 | 24.311 |
| TENSILE STRESS AT BREAK (MD) | MPa | 42.22 | 42.34 | 44.26 | 42.28 |
| TENSILE STRAIN AT BREAK (MD) | % | 709.69 | 716.88 | 702.44 | 725.12 |
| WORK AT BREAK (MD) | J | 22.812 | 23.911 | 25.333 | 24.311 |
| TRANSPARENCY | % | 93.9 | 93.9 | 93.8 | 93.9 |
| HAZE | % | 2.3 | 2.3 | 5.7 | 2.4 |
| MELTING TEMPERATURE 1 | ° C. | 148.3 | 146.5 | 159.6 | 148.3 |
| MELTING TEMPERATURE 2 | ° C. | 164 | 163.1 | X | 154.4 |
| MELTING TEMPERATURE 3 | ° C. | X | X | X | 163.4 |
| CRYSTALLISATION TEMPERATURE 1 | ° C. | 115.7 | 113.6 | 121.2 | 116.3 |
| HEAT OF CRYSTALLISATION 1 | J/g | 101.8 | 105.2 | 105.7 | 99.3 |
| XYLENE COLD SOLUBLE FRACTION | wt % | 2.23 | 5.28 | 0.5 | 3.87 |
| MWD (Xylene Insoluble Fraction) | None | 4.6 | 4.6 | 2.5 | 2.5 |
| $n_{iso}$ (Xylene Insoluble Fraction) | None | 60 | 65 | 95 | 95 |
| $n_{iso}$ (Xylene Soluble Fraction) | None | 10 | 5 | — | 4 |

TABLE 2

Surface energy results of the film which contains
100% isotactic Ziegler-Natta polypropylene (Example 1)
Report of Surface Energy Calculation

| Liquid | SFT (Total) | CA | ± |
|---|---|---|---|
| Water | 72.80 | 108.25 | 0.4 |
| Water | 72.80 | 108.09 | 0.9 |
| Water | 72.80 | 107.09 | 0.6 |
| Formamide | 58.00 | 87.93 | 0.4 |
| Formamide | 58.00 | 87.46 | 0.9 |
| Formamide | 58.00 | 87.86 | 0.4 |
| Diiodomethane | 50.80 | 66.32 | 0.7 |
| Diiodomethane | 50.80 | 66.91 | 1.2 |
| Diiodimethane | 50.80 | 66.08 | 1.2 |
| Glycerol | 64.00 | 91.67 | 0.3 |
| Glycerol | 64.00 | 91.36 | 0.4 |
| Glycerol | 64.00 | 90.59 | 0.4 |

Method used for calculation: Zisman (Z)
Calculation Results
Surface Energy (critical) 29.38 mN/m ± 0.06 mN/m
Chi^2/n: 0.0552
RQ: 0.9756

TABLE 3

Surface energy results of the film which contains 97% isotactic
Ziegler-Natta polypropylene and 3% atactic polypropylene (Example 2)
Report of Surface Energy Calculation

| Liquid | SFT (Total) | CA | ± |
|---|---|---|---|
| Water | 72.80 | 110.44 | 0.4 |
| Water | 72.80 | 109.98 | 1.0 |
| Water | 72.80 | 110.28 | 0.6 |
| Formamide | 58.20 | 87.07 | 0.5 |
| Formamide | 58.20 | 87.97 | 0.5 |
| Formamide | 58.20 | 89.24 | 0.8 |
| Diiodomethane | 50.00 | 60.66 | 0.5 |
| Diiodomethane | 50.00 | 64.77 | 1.5 |
| Diiodimethane | 50.00 | 65.61 | 0.6 |
| Glycerol | 64.00 | 87.09 | 0.5 |
| Glycerol | 64.00 | 89.55 | 0.5 |
| Glycerol | 64.00 | 91.09 | 0.5 |

Method used for calculation: Zisman (Z)
Calculation Results
Surface Energy (critical) 31.74 mN/m ± 0.06 mN/m
Chi^2/n: 0.0685
RQ: 0.9697

TABLE 4

Surface energy results of the film which contains
100% isotactic single-site polypropylene (Example 3)
Report of Surface Energy Calculation

| Liquid | SFT (Total) | CA | ± |
|---|---|---|---|
| Water | 72.80 | 108.83 | 0.6 |
| Water | 72.80 | 101.84 | 1.0 |
| Water | 72.80 | 107.74 | 0.7 |
| Formamide | 58.20 | 89.30 | 0.8 |
| Formamide | 58.20 | 89.06 | 0.5 |
| Formamide | 58.20 | 89.60 | 0.6 |
| Diiodomethane | 50.00 | 64.76 | 2.0 |
| Diiodomethane | 50.00 | 64.45 | 1.2 |
| Diiodimethane | 50.00 | 60.43 | 4.7 |
| Glycerol | 64.00 | 92.05 | 0.3 |
| Glycerol | 64.00 | 93.40 | 0.2 |
| Glycerol | 64.00 | 92.05 | 0.2 |

Method used for calculation: Zisman (Z)
Calculation Results
Surface Energy (critical) 29.57 mN/m ± 0.06 mN/m
Chi^2/n: 0.0776
RQ: 0.9562

TABLE 5

Surface energy results of the film which contains 97% isotactic
single-site polypropylene and 3% atactic polypropylene (EXAMPLE 4)
Report of Surface Energy Calculation

| Liquid | SFT (Total) | CA | ± |
|---|---|---|---|
| Water | 72.80 | 108.62 | 0.5 |
| Water | 72.80 | 109.95 | 0.3 |
| Water | 72.80 | 109.89 | 1.0 |
| Formamide | 58.00 | 89.99 | 0.1 |
| Formamide | 58.00 | 90.45 | 0.6 |
| Formamide | 58.00 | 88.97 | 0.8 |
| Diiodomethane | 50.80 | 65.64 | 0.5 |
| Diiodomethane | 50.80 | 65.80 | 0.8 |
| Diiodimethane | 50.80 | 65.44 | 0.7 |
| Glycerol | 64.00 | 93.16 | 1.2 |
| Glycerol | 64.00 | 89.19 | 0.8 |
| Glycerol | 64.00 | 94.45 | 0.5 |

Method used for calculation: Zisman (Z)
Calculation Results
Surface Energy (critical) 23.88 mN/m
Chi^2/n: 0.0819
RQ: 0.9968

The invention claimed is:

1. Article selected from the group consisting of a refrigerator, a dishwasher and a washing machine wherein the article comprises a polypropylene composition having a reduced surface energy, comprising:
   a mixture of:
   (a) an isotactic polypropylene (iPP) produced in the presence of a single site metallocene catalyst having a molecular weight distribution (MWD) of below 4.00 and a mean isotactic block length between two structural chain defects, as a statistical average, greater than 70, and
   b) an atactic polypropylene (aPP) with an absorbance ratio of the absorption band at 998 cm$^{-1}$ to the absorption band at 973 cm$^{-1}$ ($A_{998}/A_{973}$) below 0.10,
   wherein the weight ratio of said atactic polypropylene to the sum of said atactic polypropylene and said isotactic polypropylene (aPP/(aPP+iPP)) is 0.50 to 9.00 wt.-%, and
   wherein the polypropylene composition has surface energy of between 23.88 and 27 mN/m.

2. Article according to claim 1, wherein the isotactic and/or the atactic polypropylene is a homopolymer.

3. Article according to claim 1, wherein the isotactic block length of the atactic polypropylene molecule between two structural chain defects is, as a statistical average, below 20.

4. Article according to claim 1, wherein the isotactic polypropylene has a melting temperature of below 163° C.

5. Article according to claim 1, wherein the polypropylene composition has a xylene cold soluble fraction of below 15.00 wt. %.

6. Process for the reduction of surface energy of a polypropylene composition used in the manufacture of a refrigerator, a dishwasher, or a washing machine, comprising:
   (a) providing an atactic polypropylene (aPP) with an absorbance ratio of the absorption band at 998 cm$^{-1}$ to the absorption band at 973 cm$^{-1}$ ($A_{998}/A_{973}$) below 0.10,
   (b) providing an isotactic polypropylene (iPP) produced in the presence of a single site metallocene catalyst having a molecular weight distribution (MWD) of below 4.00 and a mean isotacic block length between two structural chain defects, as a statistical average, greater than 70; and, (c) reducing the surface energy of said isotactic polypropylene by mixing the atactic polypropylene (aPP) with the isotactic polypropylene (iPP) in an amount to provide a weight ratio of said atactic polypropylene to the sum of said atactic polypropylene and said isotactic polypropylene (aPP/(App+iPP)) of 0.50 to 9.00 wt.-%; and wherein the obtained polypropylene composition has a surface energy of between 23.88 and 27 mN/m.

7. Process according to claim 6, wherein the isotactic and/or the atactic polypropylene is a homopolymer.

8. Process according to claim 6, wherein the isotactic block length of the atactic polypropylene molecule between two structural chain defects is, as a statistical average, below 20.

9. Process according to claim 6, wherein the isotactic polypropylene has a melting temperature of below 163° C.

10. Process according to claim 6, wherein the polypropylene composition has a xylene cold soluble fraction of below 15.00 wt. %.

* * * * *

UNITED STATES PATENT AND TRADEMARK OFFICE
CERTIFICATE OF CORRECTION

| | | |
|---|---|---|
| PATENT NO. | : 8,283,418 B2 | Page 1 of 1 |
| APPLICATION NO. | : 12/449086 | |
| DATED | : October 9, 2012 | |
| INVENTOR(S) | : Werner Posch, Manfred Stadlbauer and Stefan Schiesser | |

It is certified that error appears in the above-identified patent and that said Letters Patent is hereby corrected as shown below:

Column 20,
Line 31, Claim 1 "metallocane" should be -- metallocene --.

Signed and Sealed this
Second Day of April, 2013

Teresa Stanek Rea
*Acting Director of the United States Patent and Trademark Office*